United States Patent
Xia et al.

(10) Patent No.: US 10,856,170 B1
(45) Date of Patent: Dec. 1, 2020

(54) REDUCING TRAFFIC IN A LOW POWER AND LOSSY NETWORK BASED ON REMOVING REDUNDANT CERTIFICATE FROM AUTHENTICATION MESSAGE DESTINED FOR CONSTRAINED WIRELESS DEVICE VIA AUTHENTICATED WIRELESS DEVICE

(71) Applicant: Cisco Technology, Inc., San Jose, CA (US)

(72) Inventors: Yajun Xia, Shanghai (CN); Chuanwei Li, Shanghai (CN); Lele Zhang, Shanghai (CN); Yinfang Wang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/438,669

(22) Filed: Jun. 12, 2019

(51) Int. Cl.
  *H04W 28/02* (2009.01)
  *H04L 29/08* (2006.01)
  (Continued)

(52) U.S. Cl.
  CPC ......... *H04W 28/021* (2013.01); *H04L 63/166* (2013.01); *H04L 67/12* (2013.01);
  (Continued)

(58) Field of Classification Search
  CPC . H04W 28/00; H04W 28/02; H04W 28/0205; H04W 28/021; H04W 28/0273;
  (Continued)

(56) References Cited

U.S. PATENT DOCUMENTS

| 7,778,235 B2 | 8/2010 | Thubert et al. |
| 8,099,593 B2 | 1/2012 | Brown et al. |
| (Continued) | | |

OTHER PUBLICATIONS

Cisco, "Cisco Connected Grid WPAN Module for CGR 1000 Series Installation and C-Mesh Configuration Guide", [Online], Jun. 2017, [retrieved on May 10, 2019]. Retrieved from the Internet: URL: <https://www.cisco.com/c/en/us/td/docs/routers/connectedgrid/modules/wpan/release_5-0/Cisco_Connected_Grid_WPAN_Module_for_CGR_1000_Series_Installation_and_CG-Mesh_Configuration_Guide.pdf>, pp. 1-52.

(Continued)

*Primary Examiner* — Kevin D Mew
(74) *Attorney, Agent, or Firm* — Leon R. Turkevich (57) ABSTRACT

In one embodiment, a method comprises: forwarding, by a root network device in a low power and lossy network, an authentication message to a constrained child network device having attached to the root network device, the authentication message generated by an authenticator device and specifying a certificate associated with the authenticator device; receiving a second authentication message destined for a second constrained network device via the constrained child network device; removing, from the second authentication message, the certificate; and outputting, by the root network device, the modified second authentication message that does not include the certificate toward the second constrained network device via the constrained child network device, the modified second authentication message causing the constrained child network device to restore the second authentication message for delivery to the second constrained network device, based on insertion of the certificate back into the modified second authentication message.

20 Claims, 6 Drawing Sheets

(51) Int. Cl.
*H04L 29/06* (2006.01)
*H04W 12/06* (2009.01)
*H04W 84/18* (2009.01)

(52) U.S. Cl.
CPC ...... *H04L 67/2852* (2013.01); *H04L 63/0823* (2013.01); *H04W 12/06* (2013.01); *H04W 84/18* (2013.01)

(58) Field of Classification Search
CPC . H04W 28/0289; H04W 12/06; H04W 84/18; H04W 84/20; H04L 63/16; H04L 63/166; H04L 63/20; H04L 63/0823; H04L 67/12; H04L 67/2852
See application file for complete search history.

(56) References Cited

U.S. PATENT DOCUMENTS

| | | | |
|---|---|---|---|
| 8,583,923 B2 | 11/2013 | Oba et al. | |
| 8,850,188 B2 | 9/2014 | Adams et al. | |
| 8,983,066 B2 | 3/2015 | Kruys et al. | |
| 10,057,269 B1* | 8/2018 | Ellingson | H04L 63/0428 |
| 2002/0147905 A1 | 10/2002 | Perlman | |
| 2007/0055867 A1* | 3/2007 | Kanungo | H04L 9/3265 |
| | | | 713/156 |
| 2007/0206537 A1* | 9/2007 | Cam-Winget | H04W 12/06 |
| | | | 370/331 |
| 2008/0010450 A1* | 1/2008 | Holtzman | H04L 9/3263 |
| | | | 713/157 |
| 2009/0113533 A1* | 4/2009 | Genty | H04L 63/0281 |
| | | | 726/7 |
| 2009/0249074 A1 | 10/2009 | Madhavan et al. | |
| 2010/0161928 A1* | 6/2010 | Sela | G06F 21/6218 |
| | | | 711/163 |
| 2012/0324125 A1* | 12/2012 | Brouk | H04L 29/06 |
| | | | 709/238 |
| 2016/0125412 A1* | 5/2016 | Cannon | G06Q 20/4014 |
| | | | 705/44 |
| 2017/0280324 A1* | 9/2017 | Beals | H04L 9/3263 |
| 2019/0149629 A1 | 5/2019 | Wetterwald et al. | |

OTHER PUBLICATIONS

Cisco, "Connected Utilities—Field Area Network 2.0 Design and Implementation Guide", [online], Jan. 2016, [retrieved on Oct. 10, 2018]. Retrieved from the Internet: URL: <https://www.cisco.com/c/en/us/td/docs/solutions/Verticals/Utilities/FAN/2-0/CU-FAN-2-DIG.pdf>, 182 pages.
Aboba et al., "Extensible Authentication Protocol (EAP)", Network Working Group, Request for Comment: 3748, Jun. 2004, pp. 1-67.
Simon et al., "The EAP-TLS Authentication Protocol", Network Working Group, Request for Comments: 5216, Mar. 2008, pp. 1-34.
Winter, Ed., et al., "RPL: IPv6 Routing Protocol for Low-Power and Lossy Networks", Internet Engineering Task Force (IETF), Request for Comments: 6550, Mar. 2012, pp. 1-157.
DeKok, "RADIUS over TCP", Internet Engineering Task Force (IETF), Request for Comments: 6613, May 2012, pp. 1-16.
Cisco, "Configuring Authorization and Revocation of Certificates in a PKI", [online], [retrieved on Apr. 24, 2019]. Retrieved from the Internet: URL: <https://www.cisco.com/c/en/us/td/docs/ios-xml/ios/sec_conn_pki/configuration/15-mt/sec-pki-15-mt-book/sec-cfg-auth-rev-cert.pdf>, pp. 1-46.

* cited by examiner

REDUCING TRAFFIC IN A LOW POWER AND LOSSY NETWORK BASED ON REMOVING REDUNDANT CERTIFICATE FROM AUTHENTICATION MESSAGE DESTINED FOR CONSTRAINED WIRELESS DEVICE VIA AUTHENTICATED WIRELESS DEVICE

TECHNICAL FIELD

The present disclosure generally relates to reducing traffic in a low power and lossy network (LLN) based on removing a redundant certificate from an authentication message destined for a constrained wireless network device via an authenticated wireless network device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"). Such large-scale wireless mesh networks (also referred to as field area networks (FANs), or Low Power and Lossy Networks (LLNs)) can be used for deployment of, for example, a connected grid mesh (CG-mesh) network advanced metering infrastructure (AMI). The LLN (e.g., CG-mesh) network can include thousands of IEEE 802.15.4e/g based resource-constrained (e.g., low-power) network devices (also referred to herein as Low Power and Lossy Network (LLN) devices), where each LLN network device can reach, within its transmission range, hundreds of neighboring network devices. Hence, noise and/or interference on a wireless RF channel can affect communications between LLN network devices.

A problem associated with the deployment of the CG-mesh network (comprising thousands of LLN devices) is that a source device outside the CG-mesh network (e.g., an authentication device such as a Remote Authentication Dial-In User Service (RADIUS) server) can cause substantial traffic burdens in the CG-mesh, based on sending to each LLN device in the CG-mesh network one or more authentication messages containing one or more certificates. In particular, a typical certificate (used to provide secure authentication of the authentication message and/or the source device) can have a size of about one kilobyte (1 kb), whereas sensor data can have a size of about one hundred (100) bytes. Hence, an authentication message having one or more certificates can be an order of magnitude larger (i.e., 10x) or more than a non-authentication message, and can cause substantial traffic burdens in the CG-mesh: the traffic burdens in the CG-mesh can result in drastic delays, where the larger-size authentication messages can delay convergence by over one month in a CG-mesh having thousands of LLN devices undergoing authentication.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: forwarding, by a root network device in a low power and lossy network, an authentication message to a constrained child network device having attached to the root network device within the low power and lossy network, the authentication message having been generated by an authenticator device and specifying a certificate associated with the authenticator device; receiving, by the root network device, a second authentication message generated by the authenticator device and destined for a second constrained network device via the constrained child network device, the second authentication message comprising the certificate; generating a modified second authentication message that does not include the certificate based on the root network device removing, from the second authentication message, the certificate; and outputting, by the root network device, the modified second authentication message toward the second constrained network device via the constrained child network device, the modified second authentication message causing the constrained child network device to restore the second authentication message for delivery to the second constrained network device, based on insertion of the certificate back into the modified second authentication message.

In another embodiment, an apparatus is implemented as a physical machine. The apparatus comprises: non-transitory machine readable media configured for storing executable machine readable code; a device interface circuit configured for receiving an authentication message from an authenticator device; and a processor circuit. The processor circuit is configured for executing the machine readable code, and when executing the machine readable code operable for: forwarding, by the apparatus implemented as a root network device in a low power and lossy network, the authentication message to a constrained child network device having attached to the root network device within the low power and lossy network, the authentication message specifying a certificate associated with the authenticator device; receiving a second authentication message generated by the authenticator device and destined for a second constrained network device via the constrained child network device, the second authentication message comprising the certificate; generating a modified second authentication message that does not include the certificate based on the root network device removing, from the second authentication message, the certificate; and outputting the modified second authentication message toward the second constrained network device via the constrained child network device, the modified second authentication message causing the constrained child network device to restore the second authentication message for delivery to the second constrained network device, based on insertion of the certificate back into the modified second authentication message.

In another embodiment, one or more non-transitory tangible media are encoded with logic for execution by a machine and when executed by the machine operable for: forwarding, by the machine implemented as a root network device in a low power and lossy network, an authentication message to a constrained child network device having attached to the root network device within the low power and lossy network, the authentication message having been generated by an authenticator device and specifying a certificate associated with the authenticator device; receiving, by the root network device, a second authentication message generated by the authenticator device and destined for a second constrained network device via the constrained child network device, the second authentication message comprising the certificate; generating a modified second authentication message that does not include the certificate based on the root network device removing, from the second authentication message, the certificate; and outputting, by the root network device, the modified second authentication message toward the second constrained network device via the constrained child network device, the modified second authentication message causing the constrained child network device to restore the second authentication message for delivery to the second constrained network device, based on insertion of the certificate back into the modified second authentication message.

In another embodiment, a method comprises: receiving from a root network device, by a constrained child network device in a low power and lossy network, an authentication message having been generated by an authenticator device and specifying a certificate associated with the authenticator device; joining, by the constrained child network device, the low power and lossy network based on the authentication message, including caching the certificate; receiving, by the constrained child network device from a root network device, a modified second authentication message modified by root network device and destined for a second constrained network device attached to the constrained child network device, the modified second authentication message having been modified based on the root network device having removed the corresponding certificate from a corresponding second authentication message generated by the authenticator device; inserting the certificate into the modified second authentication message for generation of a restored second authentication message; and sending the restored second authentication message to the second constrained network device.

In another embodiment, one or more non-transitory tangible media are encoded with logic for execution by a machine and when executed by the machine operable for: receiving from a root network device, by the machine implemented as a constrained child network device in a low power and lossy network, an authentication message having been generated by an authenticator device and specifying a certificate associated with the authenticator device; joining, by the constrained child network device, the low power and lossy network based on the authentication message, including caching the certificate; receiving, by the constrained child network device from a root network device, a modified second authentication message modified by root network device and destined for a second constrained network device attached to the constrained child network device, the modified second authentication message having been modified based on the root network device having removed the corresponding certificate from a corresponding second authentication message generated by the authenticator device; inserting the certificate into the modified second authentication message for generation of a restored second authentication message; and sending the restored second authentication message to the second constrained network device.

DETAILED DESCRIPTION

Particular embodiments enable a root network device, in a low power and lossy network (LLN) comprising multiple constrained network devices ("LLN devices"), to substantially reduce data traffic in the LLN. The root network device can substantially reduce data traffic in the LLN based on removing redundant certificates from authentication messages destined for respective LLN devices via one or more authenticated wireless devices. In particular, each LLN device during registration with an authenticator device can cache the certificate received in an authentication message generated by the authenticator device, as opposed to dropping the certificate upon completing registration. The root network device, in response to determining an authentication message is destined for an unregistered LLN device reachable via an authenticated LLN device having previously cached the certificate of the authenticator device, can generate a modified authentication message that does not include the redundant certificate, based on removing from the received authentication message the redundant certificate. The root network device can output the modified authentication message for delivery (without the certificate) toward the unregistered LLN device via the authenticated LLN device.

Hence, the root network device can cause an authenticated wireless LLN device, having previously received the certificate and cached the received certificate, to restore the authentication message based on the authenticated wireless LLN device inserting the cached certificate back into the received modified authentication message, and the authenticated wireless LLN device sending the restored authentication message (containing the certificate) to its next-hop unregistered LLN device.

Hence, the example embodiments enable a substantial reduction in the data traffic encountered in an LLN based on the root network device removing redundant certificates from authentication messages (which can have a message size of 4 kilobytes (kbytes) or more, with each certificate having a size of about 1 kbyte) to form a reduced-size modified authentication message (having a message size of about 100-200 bytes), and based on a penultimate authenticated wireless LLN device responding to reception of the reduced-size modified authentication message by using its cached certificate to restore the authentication message for delivery to its attached unregistered LLN device. Hence, intermediate authenticated wireless LLN devices can forward the reduced-size modified authentication message toward the penultimate authenticated wireless LLN device, eliminating the unnecessary transmission of the redundant certificates in the LLN.

Figure 1A:
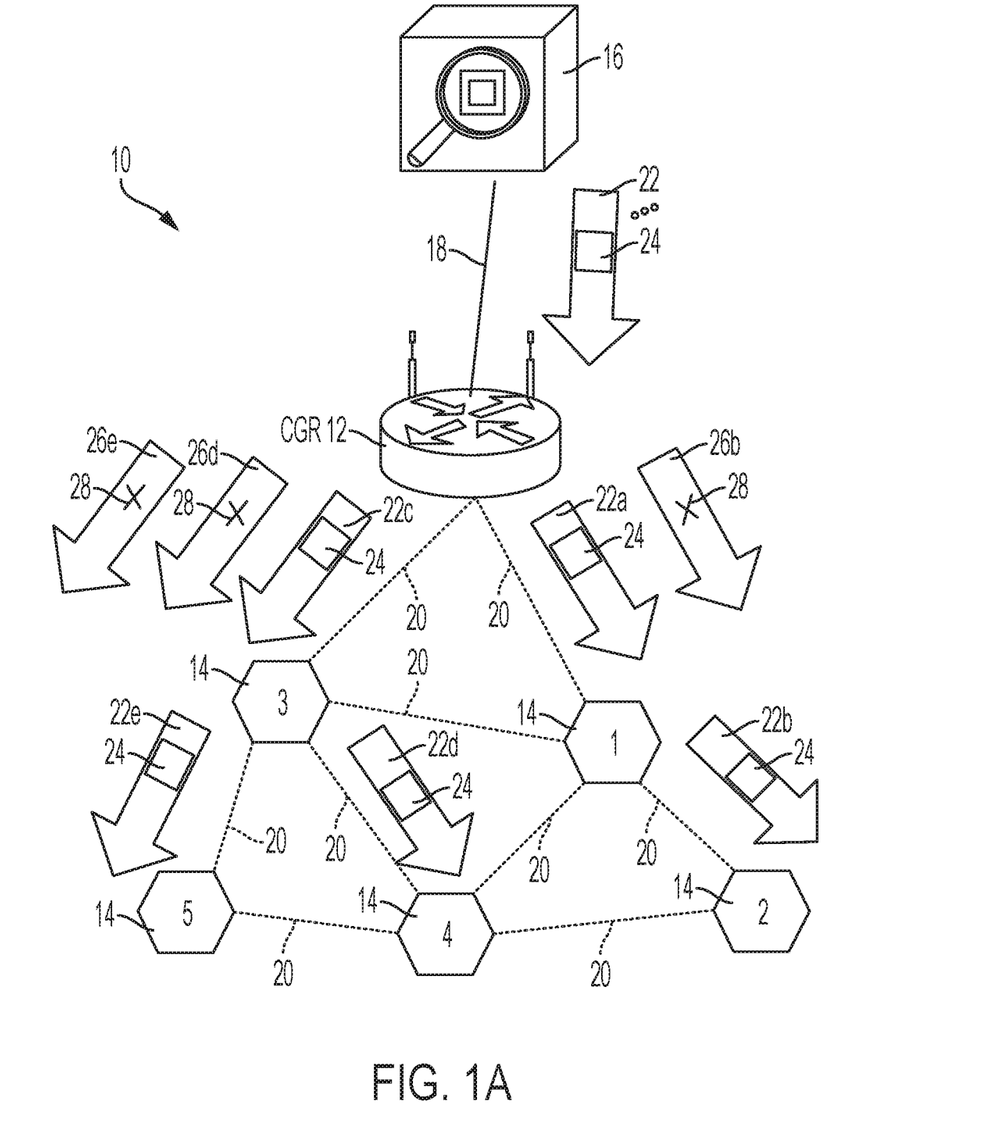
FIGS. 1A and 1B illustrate an example system having a root network device configured for removing a redundant certificate from an authentication message prior to transmission in an LLN, and an LLN device configured for using a cached copy of the certificate to restore the authentication message for delivery to a destination LLN device, according to an example embodiment.
Figure 1B:
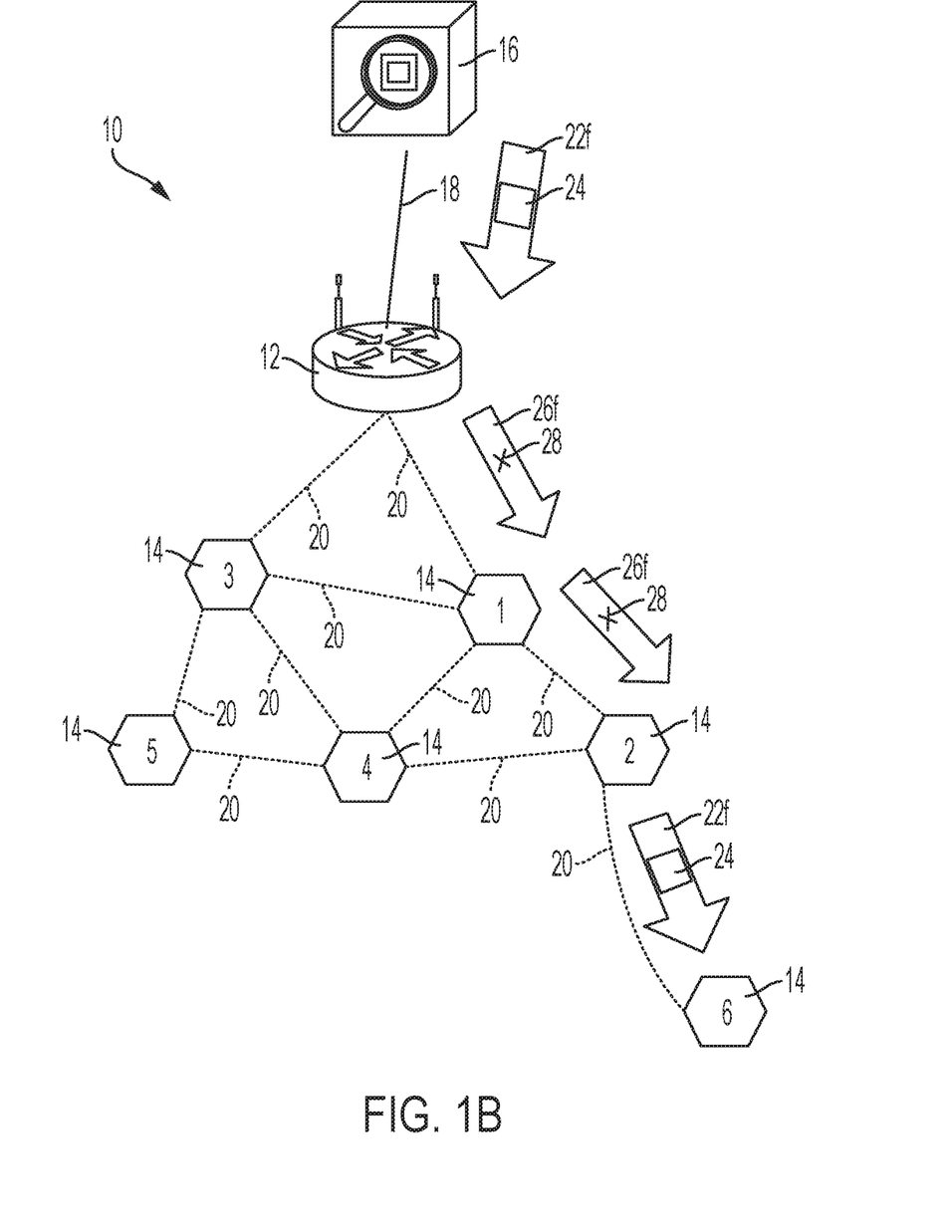

FIGS. 1A and 1B illustrate an example wireless mesh data network 10, for example an IEEE 802.15.4e/g based CG-mesh network having a root mesh network device 12 configured for operating as a directed acyclic graph (DAG) root for multiple wireless mesh network devices 14, according to an example embodiment. The root network device "CGR" 12 can be implemented, for example, as a commercially-available Cisco® 1000 Series Connected Grid Router (CGR), and/or a commercially-available Cisco® IR500 Series Wireless Personal-Area Network (WPAN) Industrial Router (e.g., IR509, IR510, IR529, IR530) from Cisco Systems, San Jose, Calif., modified as described herein; hence, the root mesh network device 12 also is referred to as a CGR 12 or DAG root 12, or a root network device "CGR" 12.

Figure 2:
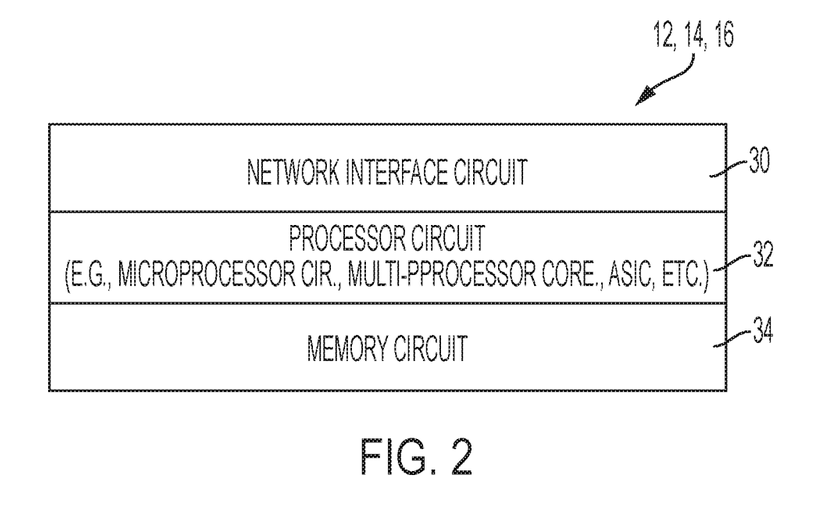
FIG. 2 illustrates an example implementation of any one of the network devices of FIGS. 1A and/or 1B, according to an example embodiment.

The root network device "CGR" 12 can serve as a "sink" for the mesh network devices 14, for example the root network device "CGR" 12 enables the wireless mesh network devices 14 to reach an authenticator device 16 via a wired backbone link 18, and/or different remote devices (not shown) that can be reachable via a wide area network such as the Internet (not shown). As illustrated in FIGS. 1A and/or 1B, each wireless mesh network device 14 in the wireless mesh data network 10 can establish a link layer mesh topology via wireless data links 20. Each wireless mesh network device 14 can be implemented as a constrained network device, or "LLN device" or "CG-mesh" device (e.g., a connected grid endpoint (CGE)), configured for operating for example as a RPL node according to the Internet Engineering Task Force (IETF) Request for Comments (RFC) 6550. Hence, each wireless mesh network device 14 can establish a tree-based network topology overlying the wireless mesh data network 10, described below, that is rooted at the root network device "CGR" 12.

The root network device "CGR" 12 can be configured for causing creation of a tree-based topology overlying the link layer mesh data network 10 based on transmitting one or more DODAG information object (DIO) messages, for example according to RFC 6550. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 20 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device 12 in the form of a directed acyclic graph (DAG) toward the root network device "CGR" 12, where all routes in the LLN terminate at the root network device "CGR" 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., node "5" or beyond).

The DODAG can be formed based on a DODAG information object (DIO) advertised by the DAG root 12, where a "child" network device (e.g., "1") 14 detecting the DIO can select the DAG root 12 as a parent in the identified DODAG based on comparing network topology metrics (advertised in the DIO) to a prescribed objective function of the RPL instance. The "child" network device (e.g., "1") 14, upon attaching to its parent, can output its own DIO with updated network topology metrics that enable other wireless mesh network devices 14 to discover the DODAG, learn the updated network topology metrics, and select a DODAG parent.

A single instance of the DODAG or DAG also is referred to as a Personal Area Network (PAN). Hence, a wireless mesh data network 10 can include a plurality of PANs (not shown in FIGS. 1A and/or 1B), where each PAN includes one DAG root 12 (exclusively allocated to the PAN) and multiple wireless mesh network devices 14 connected exclusively within the PAN according to the DIO messages originated by the corresponding one DAG root 12. Hence, unless explicitly stated otherwise herein, a wireless mesh network device 14 is configured to belong to only one PAN at a time, i.e., a wireless mesh network device 14 is configured to be attached only within one DODAG, although the wireless mesh network device 14 can be configured for attachment to one or more parent network devices 14 within a single DODAG.

Downward routes (i.e., away from the DAG root) can be created based on Destination Advertisement Object (DAO) messages that are created by a wireless mesh network device 14 and propagated toward the DAG root 12. The RPL instance can implement downward routes in the DAG of the LLN in either a storing mode only (fully stateful), or a non-storing mode only (fully source routed by the DAG root), or a combination thereof (e.g., some parent network devices operate in storing mode and one or more child network devices operate in non-storing mode only). In storing mode, a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Each mesh network device 14 in the wireless mesh data network 10 can be configured for operating in storing mode, non-storing mode, and/or a combination thereof. Hence, each wireless mesh network device 14 can unicast transmit its DAO message to its parent (and/or the DAG root 12) in accordance with RFC 6550. The DAG root 12, in response to receiving the DAO messages from the RPL nodes 14, can build the entire DAG topology and store the DAG topology in its memory circuit 34 (illustrated in FIG. 2), including storage of heuristics of usage, path length, knowledge of device capacity, link reliability, etc.

A wireless mesh network device 14 can operate as a parent network device (e.g., "2" of FIG. 1B) for an attached "child" RPL node (e.g., "6" of FIG. 1B). For example, in response to a parent network device "2" receiving a data packet originated by its child network device "6" 14, the parent network device "2" can cache a downward path (i.e., away from the DAG root 12) that the target device "6" 14 is reachable via a given egress interface on the parent device "2" (e.g., output to an IPv6 address "2::6" that is the attachment address of the target device "6"); the next parent network device "1", in response to receiving the data packet from its child RPL node "2", can cache the downward path that the target device "6" 14 is reachable via the child RPL node "2".

Hence, each of the parent network devices "1", "2", etc. 14 can execute a caching (e.g., a transient caching on a temporary basis) of a downward path (i.e., away from the DAG root 12) for reaching the target network device "6" 14, independent of any route table entry in the parent network device; moreover, a common parent device 14 can cache downward paths toward multiple "target devices" within its sub-DAG, such that a data packet originated by one RPL node and destined toward another RPL node in the same sub-DAG can be forwarded by the common parent device to the corresponding parent device of the destination target, eliminating the necessity that the data packet be forwarded via the default route toward the DAG root 12.

As described in further detail below with respect to FIGS. 3-4, each LLN device 14 can be required to execute an Institute of Electrical and Electronics Engineers (IEEE) 802.1x authentication with the authenticator device 16, including receiving from the authenticator device 16 an authentication message 22 comprising a secure certificate 24. For example, each LLN device 14 can be required to obtain encryption keys including Pairwise Transient Key (PTK) and Group Temporal Key (GTK), for example based on IEEE 802.11i-2004 four-way handshake. Data packets in the low power and lossy network 10 can thus be encrypted with GTK to ensure security.

Consequently, each LLN device 14 joining the PAN 10 can be required to execute multiple message handshakes with the authenticator device 16, including 802.1x Extensible Authentication Protocol Transport Layer Security (EAP-TLS) handshakes (for authentication) (described in further detail in the IETF RFC 5216, "The EAP-TLS Authentication Protocol"), 802.11i 4 way handshakes (for generating PTK/GTK), DHCPv6 handshakes (for obtaining an IPv6 address), RPL handshakes (e.g., DIO messages, DAO messages, etc. for creating the routes between the LLN devices 14 and the root network device "CGR" 12, for example according to RFC 6550). As described previously, the IEEE 802.1x EAP-TLS has a maximum number of handshake messages, and some of the handshake messages can be encapsulated with up to four (4) or more secure certificates 24 (also referred to herein as a secure certificate chain), each secure certificate 24 having a size of 1k bytes or more. As illustrated in FIGS. 1A and/or 1B, each LLN device 14 needs to execute authentication with the authenticator device 16 based on receiving a corresponding authentication message 22 with the secure certificate 24 owned by the authenticator device 16. However, the transmission of the secure certificate 24 in each authentication message 22 can substantially increase the data traffic in the low power and lossy network 10.

As described in further detail below, the root network device "CGR" 12, in response to receiving a authentication message 22 destined for a next-hop child network device (e.g., "1" or "3"), can forward the corresponding authentication message (e.g., 22a, 22c) containing the secure certificate 24. Each next-hop child network device (e.g., "1" or "3"), as part of its authentication operations, can cache the received secure certificate 24 in its memory circuit.

Hence, the root network device "CGR" 12 can respond to reception of a authentication message 22 destined for a destination wireless mesh network device (e.g., "2", "4", "5", "6") 14 reachable via an authenticated attached child network device (e.g., "1", "3") 14 by removing the secure certificate 24 from the received authentication message 22 (thus generating a modified authentication message 26 that does not include the secure certificate 24), and outputting the modified authentication message 26 to the destination wireless mesh network device (e.g., "2", "4", "5", "6") 14 via the next-hop authenticated attached child network device (e.g., "1", "3"). As illustrated in FIGS. 1A and 1B, each modified authentication message 26 has a designated mark "X" 28 indicating removal of the secure certificate 24 (and/or a 1-bit certificate restoration flag); hence, the secure certificate 24 in the authentication message 22 can be replaced by the root network device "CGR" 12 with a certificate restoration flag 28 in the modified authentication message 26, reducing size of the modified authentication message 26 by one (1) kbytes or more.

Hence, each penultimate authenticated wireless LLN device (e.g., "1", "3" of FIG. 1A; "2" of FIG. 1B) can respond to reception of the reduced-size modified authentication message 26 by using its cached certificate to restore the authentication message (e.g., 22b, 22d, 22e of FIG. 1A; 22f of FIG. 1B) for delivery to its attached unregistered LLN device (e.g., "2", "4", "5" of FIG. 1A; "6" of FIG. 1B) 14. Hence, as illustrated in FIG. 1B, an intermediate authenticated wireless LLN device (e.g., "1" of FIG. 1B) can forward the reduced-size modified authentication message 26f toward the penultimate authenticated wireless LLN device (e.g., "2" of FIG. 1B), and the penultimate authenticated wireless LLN device (e.g., "2" of FIG. 1B) can restore the authentication message 22f by inserting its locally-cached secure certificate 24 into the received modified authentication message 26f, and sending the restored authentication message 22f to its attached wireless mesh network device "6" 14.

FIG. 2 illustrates an example implementation of any one of the devices 12, 14, and/or 16 of FIGS. 1A and/or 1B, according to an example embodiment. Each device 12, 14, and/or 16 is a physical machine (i.e., a hardware device) configured for communications with any other device 12, 14, and/or 16.

Each apparatus 12, 14, and/or 16 can include a device interface circuit 30, a processor circuit 32, and a memory circuit 34. The device interface circuit 30 can include one or more distinct physical layer transceivers for communication with any one of the other devices 12, 14, and/or 16; the device interface circuit 30 also can include an IEEE based Ethernet transceiver for communications with the devices of FIGS. 1A and/or 1B via any type of data link (e.g., a wired or wireless link, an optical link, etc.), for example a wireless IEEE 802.15.4e/g data link. For example, the root network device "CGR" 12 can have a wired transceiver for communications via the backbone link 18, and a wireless transceiver for communication with the wireless mesh network devices 14. The authenticator device 16 can have a wired transceiver for communications via the backbone link 18, and optionally a wireless transceiver. Each wireless mesh network device 14 can include one or more wireless transceivers.

The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, and/or 16 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3A:
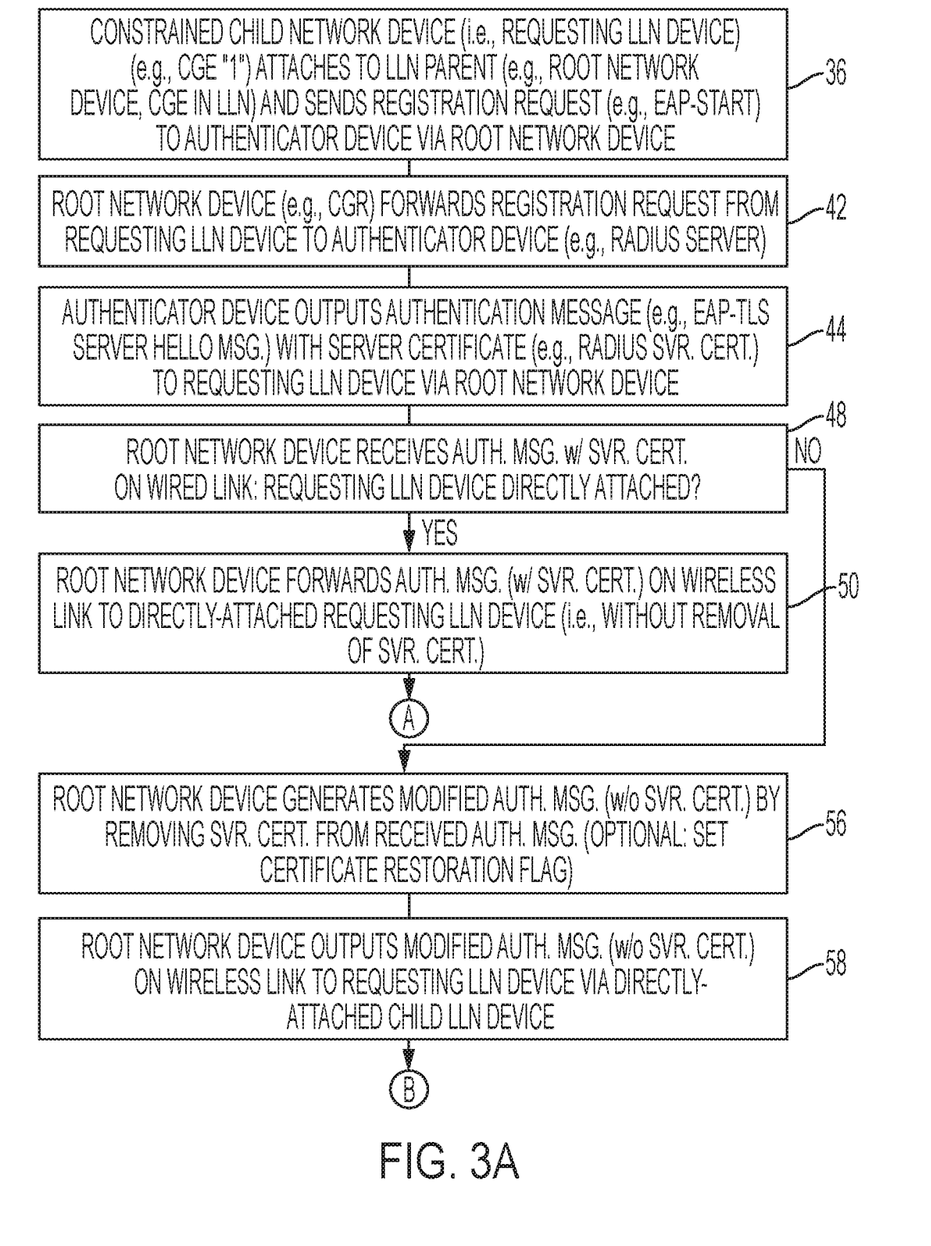
FIGS. 3A-3C illustrate example execution of a root network device removing a redundant certificate from an authentication message prior to transmission in an LLN, and an LLN device using a cached copy of the certificate to restore the authentication message for delivery to a destination LLN device, according to an example embodiment.
Figure 3B:
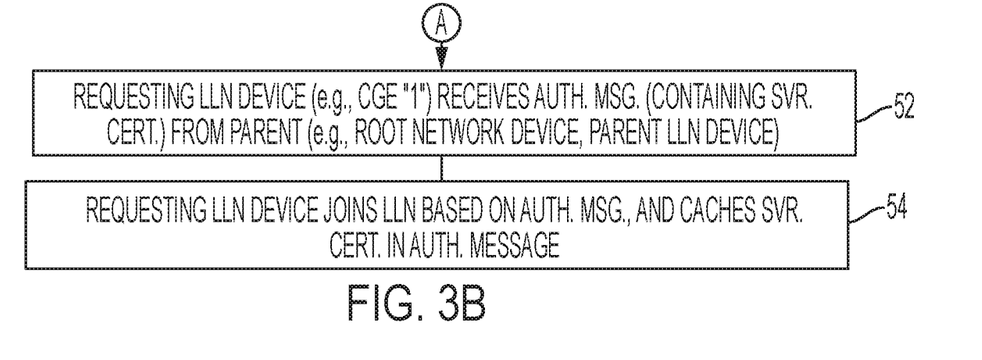
Figure 3C:
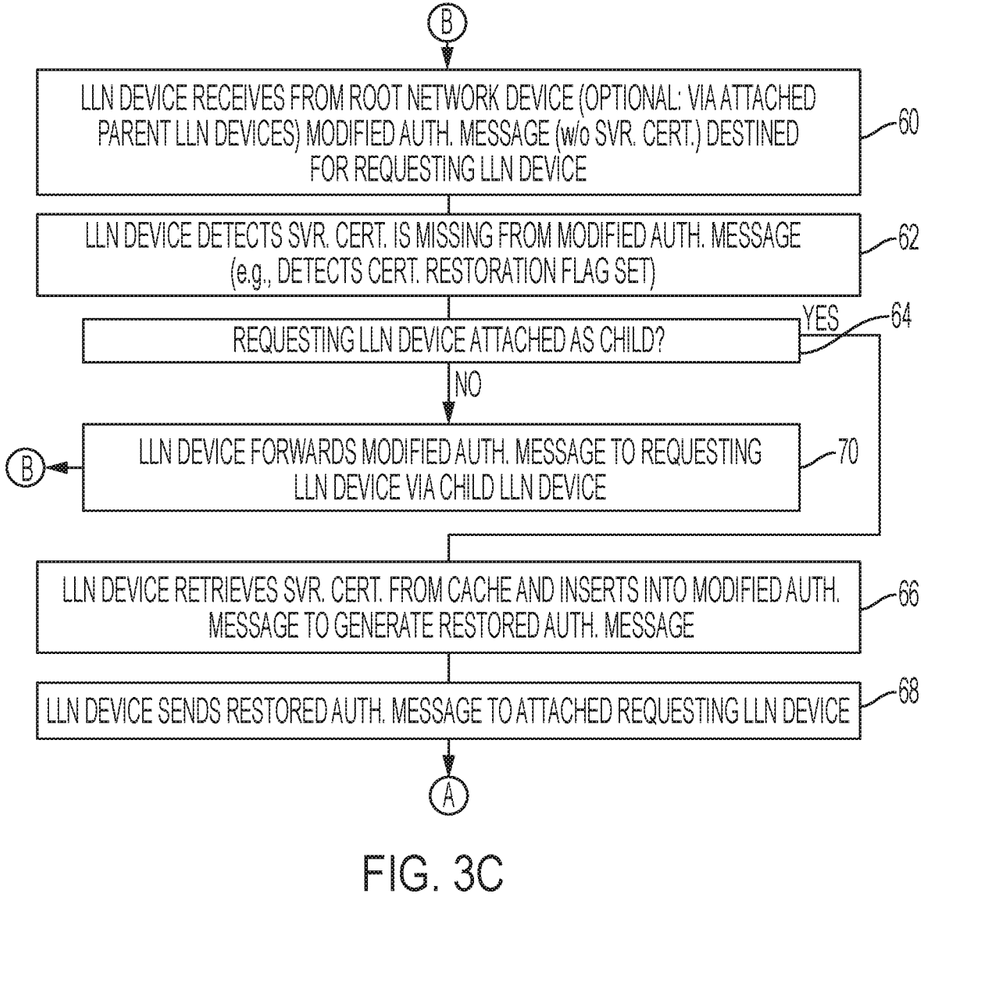

FIGS. 3A-3C illustrate example execution of a root network device removing a redundant certificate from an authentication message prior to transmission in an LLN, and an LLN device using a cached copy of the certificate to restore the authentication message for delivery to a destination LLN device, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, a constrained child network device (e.g., the CGE "1") 14 in operation 36 can attach to the root network device "CGR" 12, and in response can send (as an IEEE 802.1x Supplicant device 38 of FIG. 4) a registration request (e.g., an IEEE 802.1x EAP-START message 40 of FIG. 4) to the authenticator device 16 operating, for example as an IEEE 802.1x Authenticator. The processor circuit 32 of the root network device "CGR" 12 in operation 42 can forward the received registration request 40, received from its attached child network device (e.g., the CGE "1") 14 via the wireless data link 20, to the authenticator device 16 via the wireless backbone link 18.

The authenticator device 16 can respond to the received registration request 40 by executing IEEE 802.1x operations (e.g., as a RADIUS server) with the supplicant device 38 (e.g., the CGE "1" 14), including generating and outputting in operation 44 an authentication message (e.g., an EAP-TLS server hello message 46 of FIG. 4) 22a that contains one or more IEEE 802.1x based secure certificates 24, for example a secure certificate chain of multiple individual secure certificates: the authenticator device 16 can output the authentication message 22a to the supplicant device 38 (e.g., the CGE "1" 14) via the root network device "CGR" 12.

The device interface circuit 30 of the root network device "CGR" 12 is configured for receiving in operation 48 the authentication message 22a via the wireless backbone link 18. The processor circuit 32 of the root network device "CGR" 12 in operation 48 determines whether the received authentication message 22 is destined for a requesting LLN device 14 that is directly attached to the root network device "CGR" 12 (e.g., based on identifying the requesting LLN device in a "target address" field in the authentication message 22): in response to the processor circuit 32 of the root network device "CGR" 12 determining in operation 48 (e.g., from the "target address" field) that the authentication message 22a is destined for the directly-attached requesting LLN device "1" 14, the processor circuit 32 of the root network device "CGR" 12 is configured for forwarding in operation 50 the received authentication message 22a to the directly-attached requesting LLN device "1" 14 via the wireless data link 20 as illustrated in FIG. 1A, without any removal of the secure certificate 24.

Figure 4:
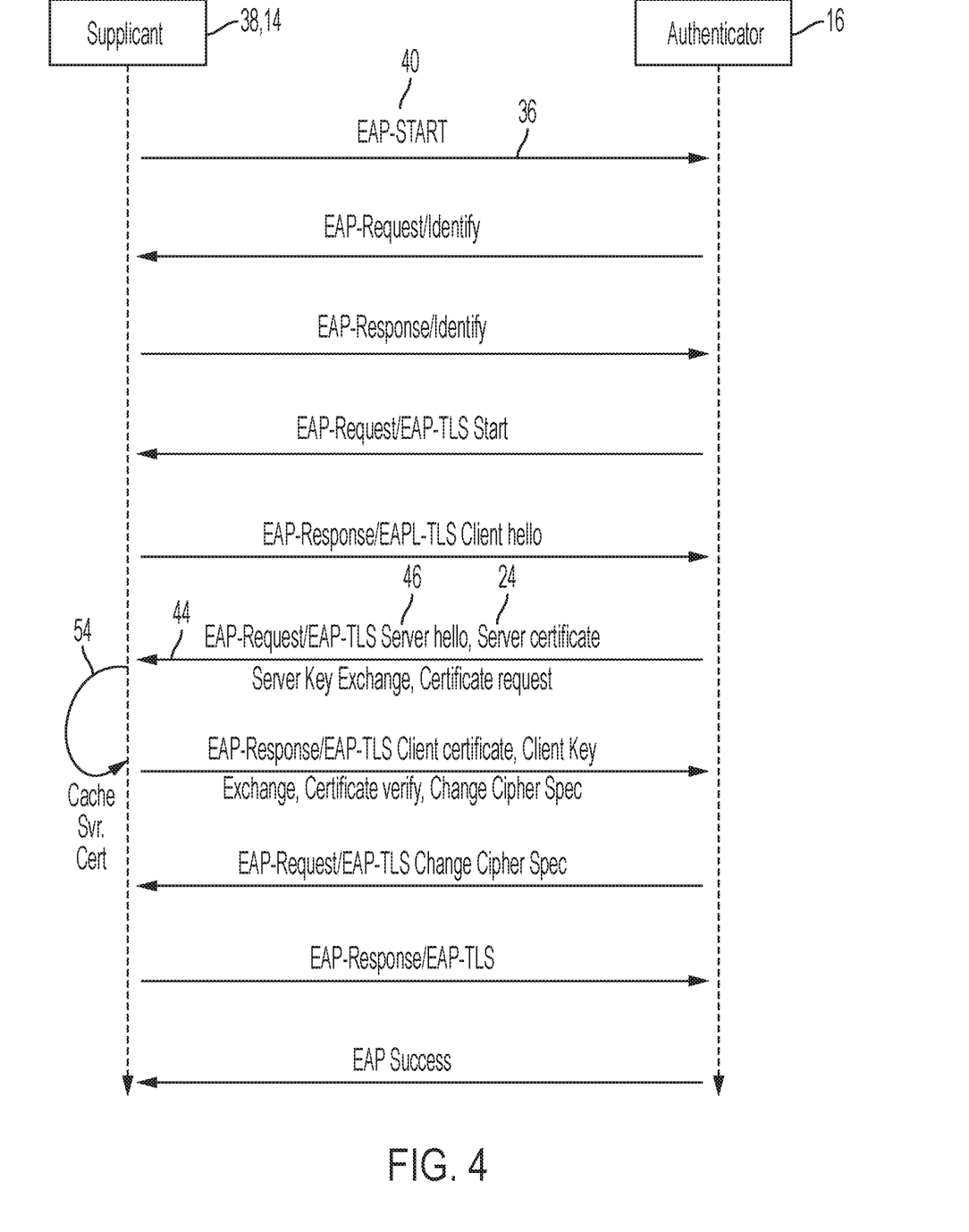
FIG. 4 illustrates an example secure registration of an LLN device in the LLN of FIGS. 1A and 1B, including caching the certificate in the received authentication message.

Referring to FIG. 3B, the processor circuit 32 of the directly-attached requesting LLN device "1" 14 can respond to receiving the authentication message 22a in operation 52 by completing the authentication IEEE 802.1x operations of FIG. 4: according to an example embodiment, the processor circuit 32 of the directly-attached requesting LLN device "1" 14 can cache in operation 54 the received secure certificate 24 in its memory circuit 34, enabling the directly-attached requesting LLN device "1" 14 to restore any authentication message (e.g., 22b) in response to receiving a modified authentication message 26 targeted for an attached child network device (e.g., "2" 14 of FIG. 1A).

Hence, the requesting LLN device "3" 14 of FIG. 1A can attach to the low power and lossy network 10 as described above, including sending the registration request 40: as described previously with respect to the requesting LLN device "1" 14, the processor circuit 32 of the root network device "CGR" 12 in operation 48 can determine in operation 48 that the authentication message 22c is destined for the directly-attached requesting LLN device "3" 14, and in response forward the authentication message 22c (containing the secure certificate 24) to the directly-attached requesting LLN device "3" 14. The authentication message 22c can cause the directly-attached requesting LLN device "3" 14 in operations 52 and 54 of FIG. 3B to join the low power and lossy network 10, including caching in operation 54 the received secure certificate 24 in its memory circuit 34.

Referring to FIGS. 1A and 36, assume that any one of the LLN devices "2", "4", and/or "5" 14 of FIG. 1A in operation 36 attach to an authenticated CGE device "1" or "3" 14, and in response send a corresponding registration request 40 to the authenticator device 16 via its authenticated parent CGE device "1" or "3" 14 and the root network device "CGR" 12. The authenticator device 16 can respond to the registration request 40 by generating and outputting a corresponding authentication message 22b, 22d, and/or 22e to the requesting LLN device "2", "4", and/or "5" 14, via the root network device "CGR" 12.

The processor circuit 32 of the root network device "CGR" 12 can respond to reception of the authentication message 22b, 22d, and/or 22e (each containing the secure certificate 24) by determining in operation 48 that the targeted (i.e., destination) requesting LLN device "2", "4", and/or "5" 14 is not directly attached, but is only reachable via a directly-attached authenticated CGE device "1" (for LLN device "2") or "3" (for LLN devices "4" or "5") 14. In response to determining the targeted (i.e., destination) requesting LLN device is not directly attached, the processor circuit 32 of the root network device "CGR" 12 in operation 56 can generate a modified authentication message 26 (without the secure certificate 24) based on removing the secure certificate 24 from the received authentication message 22, and optionally adding a certificate restoration flag 28 indicating that the secure certificate 24 needs to be restored by a penultimate authorized LLN device 14.

The processor circuit 32 of the root network device "CGR" 12 in operation 58 can output the modified authentication message 26 (without the secure certificate 24) on the wireless data link 20 to the requesting LLN device "2", "4", and/or "5" 14 (or "6" of FIG. 1B) via a directly-attached authenticated CGE device "1" or "3". As illustrated in FIG. 1A, the processor circuit 32 of the root network device "CGR" 12 in operation 58 can output the modified authentication message 26b (targeted for the requesting LLN device "2" 14) to the directly-attached authenticated CGE device "1"; the processor circuit 32 of the root network device "CGR" 12 in operation 58 also can output the modified authentication message 26d (targeted for the requesting LLN device "4" 14) to the directly-attached authenticated CGE device "3"; and the processor circuit 32 of the root network device "CGR" 12 in operation 58 can output the modified authentication message 26e (targeted for the requesting LLN device "5" 14) to the directly-attached authenticated CGE device "3". As illustrated in FIG. 1B, the processor circuit 32 of the root network device "CGR" 12 in operation 56 can generate the modified authentication message 26f based on removing the secure certificate 24 from the received authentication message 22f. The processor circuit 32 of the root network device "CGR" 12 can output in operation 58 the modified authentication message 26f (without the secure certificate 24) toward the requesting LLN device "6" via the directly-attached authenticated CGE device "1" 14.

Referring to FIG. 3C, an authenticated CGE device (e.g., "1" or "3" of FIG. 1A) 14 can receive in operation 60 from the root network device "CGR" 12 (via the wireless data link 20) a modified authentication message 26 that does not contain the secure certificate (but can include a certificate restoration flag 28); for example, the authenticated CGE device "1" 14 can receive the modified authentication message 26b targeted for a requesting LLN device "2" 14 (as in FIG. 1A); the authenticated CGE device "3" 14 can receive the modified authentication message 26d and/or modified authentication message 26e targeted for the requesting LLN devices "4" and/or "5" 14, respectively. The processor circuit 32 of the authenticated CGE device (e.g., "1" or "3" of FIG. 1 FIGS. 1A and/or 1B) 14 in operation 62 can determine that the secure certificate 24 is missing, for example based on a determined absence of the secure certificate 24, or based on a certificate restoration flag 28 explicitly indicating that restoration of the secure certificate 24 is needed.

The processor circuit 32 of the authenticated CGE device (e.g., "1" or "3" of FIG. 1A) 14 in operation 64 can determine whether the requesting LLN device (identified in a "target address" field in the certificate restoration flag 28) is directly attached as a child LLN device. For example, the processor circuit 32 of the authenticated CGE device "1" 14 can determine in operation 64 that the requesting LLN device for the modified authentication message 26b (identified in the "target address" field in the certificate restoration flag 28b) is directly attached as the requesting LLN device "2" 14; the processor circuit 32 of the authenticated CGE device "3" can determine in operation 64 that the requesting LLN device for the modified authentication message 26d (identified in the "target address" field in the certificate restoration flag 28d) is directly attached as the requesting LLN device "4" 14, and/or that the requesting LLN device for the modified authentication message 26e (identified in the "target address" field in the certificate restoration flag 28e) is directly attached as the requesting LLN device "5" 14.

In response to the processor circuit 32 of the authenticated CGE device (e.g., "1" or "3" of FIG. 1A) 14 determining a requesting LLN device is attached as a child network device, the processor circuit 32 of the authenticated CGE device (e.g., "1" or "3" of FIG. 1A) 14 in operation 66 can retrieve the cached secure certificate 24 from its memory circuit 34, and insert the retrieved cached secure certificate 24 into the received modified authentication message 26 in order to generate the restored authentication message 22. For example, the authenticated CGE device "1" 14 can insert the retrieved cached secure certificate 24 into the modified authentication message 26b for generation of the restored authentication message 22b; the authenticated CGE device "3" 14 can insert the retrieved cached secure certificate 24 into the modified authentication message 26d and/or 26e for generation of the restored authentication message 22d and/or 26e, respectively.

The processor circuit 32 of the authenticated CGE device (e.g., "1" or "3" of FIG. 1A) 14 in operation 68 can send the restored authentication message 22 to the attached requesting LLN device 14. Hence, the authenticated CGE device "1" in operation 68 can send the restored authentication message 22b to the attached requesting LLN device "2" 14; the authenticated CGE device "3" in operation 68 can send the restored authentication message 22d to the attached requesting LLN device "4"; the authenticated CGE device "3" in operation 68 also can send the restored authentication message 22e to the attached requesting LLN device "5".

Hence, each of the attached requesting LLN devices "2", "4", and "5" in operations 52 and 54 of FIG. 3B can respond to reception of the respective recovered authentication messages 22b, 22d, and 22e by joining the low power and lossy network 10 as described above, including caching in operation 54 the received secure certificate 24. Hence, the example embodiments enable the requesting LLN devices "2", "4", and "5" to join the low power and lossy network 10, while avoiding the redundant transmissions of the secure certificate 24 from the root network device "CGR" 12 to the first-hop authenticated CGE devices "1" and "3".

FIG. 1B illustrates that the LLN device "2", following authentication and caching and of the secure certificate 24 in operation 54, can further minimize unnecessary transmission of a redundant certificate. As described previously with respect to operation 60 of FIG. 3C, the processor circuit 32 of the authenticated CGE device "1" 14 can receive the modified authentication message 26f targeted for a requesting LLN device "6" 14 as illustrated in FIG. 1B. The processor circuit 32 of the authenticated CGE device "1" 14 can determine (from the "target address" field of the modified authentication message 26f) that the requesting LLN device "6" is not directly attached as a child, and in response the processor circuit 32 of the authenticated CGE device "1" 14 can forward in operation 70 the modified authentication message 26f via the next-hop child LLN device "2" 14, for example based on a route entry specified in the modified authentication message 26 (e.g., in RPL non-storing mode) or stored as a route entry in the memory circuit 34 (e.g., in RPL storing mode).

The processor circuit 32 of the next-hop authenticated CGE device "2" 14 in operation 60 can respond to receiving the modified authentication message 26f by determining (following operation 62) in operation 64 (from the "target address" field of the modified authentication message 26f) that the requesting LLN device "6" is directly attached as a child device. Hence, the processor circuit 32 of the penultimate authenticated wireless LLN device "2" in operation 66 can restore the authentication message 22f based on inserting the cached secure certificate 24 into the received modified authentication message 26f, and sending in operation 68 the restored authentication message 22f to its attached wireless mesh network device "6" 14. As described previously, the processor circuit 32 of the requesting LLN device "6" 14 in operations 52 and 54 of FIG. 3B can join the low power and lossy network 10, including caching in operation 54 the received secure certificate 24 in its memory circuit 34.

According to example embodiments, traffic in the LLN 10 can be substantially reduced based on removing redundant secure certificates from the authentication messages (e.g., EAP-TLS Server hello messages) output by the authenticator device (e.g., RADIUS server) 16. In particular, the size of network traffic is a function of the number of network devices "num(i)" at a given hop count "i" (where hop count=1 at the root network device "CGR" 12; hop count=2 for devices "1" and "3"; hop count=3 for devices "2", "4", and "5"; hop count=4 for device "6"). Hence, the devices "1" and "3" at hop count "2" necessarily require two (2) authentication messages 22a and 22c, i.e., "(i−1)*num(i)=(2−1)(2)=2" (i=2); the additional devices "2", "4", and "5" at hop count "i=3" require an additional three (3) authentication messages 22b, 22d and 22e. However, conventional techniques would require the authentication messages 22b, 22d, and 22e to be propagated via the devices "1" and "3" at hop count "2", i.e., "(i−1)*num(i)=(3−1)(3)=6" (i=3), and the authentication message 22f for the additional device "6" would require the additional authentication message 22f plus propagation via the root network device "CGR" 12 and the device "1", i.e., "(i−1)*num(i)=(4−1)(1)=3" (i=4), resulting in a total data traffic bandwidth requirement in a conventional network as:

$$\text{TRAFFIC\_CONVENTIONAL} = \Sigma (i-1)*\text{num}(i) *\text{SvrCertChainSize}, i=2 \text{ to } N, \quad (1)$$

where "N" equals the maximum number of hops in the LLN network, "num(i)" equals the number of LLN devices at a given hop "i", and "SvrCertChainSize" equals the size of the secure certificate 24 in bytes. Hence, according to Equation (1) a conventional deployment of the authentication messages 22 to the wireless mesh network devices "1" through "5" 14 would conventionally result in a total data bandwidth requirement of "TRAFFIC_CONVENTIONAL=8*SvrCertChainSize" (e.g., 24 kbytes if "SvrCertChainSize=3 kbytes"); further, according to Equation (1) a conventional deployment of authentication messages 22 to the LLN devices "1" through "6" 14 would result in a total data bandwidth requirement of "TRAFFIC_CONVENTIONAL=11*SvrCertChainSize" (e.g., 33 kbytes if "SvrCertChainSize=3 kbytes").

In contrast, the example embodiments can minimize the transmission of authentication messages 22 (containing the secure certificate 24) in the low power and lossy network 10 to only a single transmission instance per LLN device 14 (e.g., five (5) authentication messages 22a through 22e for the respective LLN devices "1" through "5" in FIG. 1A, plus an added sixth (6th) authentication messages 22f for the LLN device "6" in FIG. 1B, i.e.:

$$\text{TRAFFIC\_MINIMIZED} = \Sigma \text{num}(i)*\text{SvrCertChainSize}, i=2 \text{ to } N. \quad (2)$$

Hence, the example embodiments enable a minimized bandwidth requirement in FIG. 1A for LLN devices "1" through "5" of "TRAFFIC_MINIMIZED=5*SvrCertChainSize" (e.g., 15 kbytes if "SvrCertChainSize=3 kbytes"). In the case of the low power and lossy network 10 illustrated in FIG. 1B, the total minimized bandwidth requirement for LLN devices "1" through "6" is:

$$\text{"TRAFFIC\_MINIMIZED} = 6*\text{SvrCertChainSize"} \quad (3)$$

(e.g., 18 kbytes if "SvrCertChainSize=3 kbytes"). Hence, the example embodiments can reduce the network traffic in the low power and lossy network 10 by the difference between the "TRAFFIC_CONVENTIONAL" and the "TRAFFIC_MINIMIZED", i.e.:

$$\text{TRAFFIC REDUCTION} = \text{TRAFFIC\_CONVENTIONAL} - \text{TRAFFIC\_MINIMIZED} \quad (4)$$

or:

$$\text{TRAFFIC REDUCTION} = \Sigma (i-2)*\text{num}(i)*\text{SvrCertChainSize}, i=2 \text{ to } N. \quad (5)$$

Although the example embodiments describe reducing traffic based on removing a redundant certificate (or certificate chain), the example embodiments can be applied to removing other redundant data structures in the low power and lossy network.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

forwarding, by a root network device in a low power and lossy network, an authentication message to a constrained child network device having attached to the root network device within the low power and lossy network, the authentication message having been generated by an authenticator device and specifying a certificate associated with the authenticator device;

receiving, by the root network device, a second authentication message generated by the authenticator device and destined for a second constrained network device via the constrained child network device, the second authentication message comprising the certificate;

generating a modified second authentication message that does not include the certificate based on the root network device removing, from the second authentication message, the certificate; and outputting, by the root network device, the modified second authentication message toward the second constrained network device via the constrained child network device, the modified second authentication message causing the constrained child network device to restore the second authentication message for delivery to the second constrained network device, based on insertion of the certificate back into the modified second authentication message.

2. The method of claim 1, wherein the forwarding includes causing the constrained child network device to cache the certificate in the authentication message.

3. The method of claim 1, wherein the forwarding includes:

receiving the authentication message from the authenticator device via a wired data link; and outputting the authentication message to the constrained child network device via a wireless data link.

4. The method of claim 1, wherein the authentication message is an Extensible Authentication Protocol Transport Layer Security (EAP-TLS) server hello message and the certificate is a Remote Authentication Dial-In User Service (RADIUS) server certificate.

5. The method of claim 1, wherein the forwarding includes forwarding any authentication message, received from the authenticator device and destined for any constrained child network device attached to the root network device, to said any constrained child network device without removal of the corresponding certificate.

6. The method of claim 1, wherein the generating includes removing, from any second authentication message generated by the authenticator device and destined for any constrained network device via any constrained child network device attached to the root network device, the corresponding certificate prior to forwarding of a corresponding modified second authentication message, without the corresponding certificate, via the corresponding constrained child network device.

7. An apparatus implemented as a physical machine, the apparatus comprising:

non-transitory machine readable media configured for storing executable machine readable code;

a device interface circuit configured for receiving an authentication message from an authenticator device; and a processor circuit configured for executing the machine readable code, and when executing the machine readable code operable for:

forwarding, by the apparatus implemented as a root network device in a low power and lossy network, the authentication message to a constrained child network device having attached to the root network device within the low power and lossy network, the authentication message specifying a certificate associated with the authenticator device, receiving a second authentication message generated by the authenticator device and destined for a second constrained network device via the constrained child network device, the second authentication message comprising the certificate, generating a modified second authentication message that does not include the certificate based on the root network device removing, from the second authentication message, the certificate, and outputting the modified second authentication message toward the second constrained network device via the constrained child network device, the modified second authentication message causing the constrained child network device to restore the second authentication message for delivery to the second constrained network device, based on insertion of the certificate back into the modified second authentication message.

8. The apparatus of claim 7, wherein the processor circuit is configured for causing the constrained child network device to cache the certificate in the authentication message.

9. The apparatus of claim 7, wherein the device interface circuit is configured for:

receiving the authentication message from the authenticator device via a wired data link; and outputting the authentication message to the constrained child network device via a wireless data link.

10. The apparatus of claim 7, wherein the authentication message is an Extensible Authentication Protocol Transport Layer Security (EAP-TLS) server hello message and the certificate is a Remote Authentication Dial-In User Service (RADIUS) server certificate.

11. The apparatus of claim 7, wherein the processor circuit is configured for forwarding any authentication message, received from the authenticator device and destined for any constrained child network device attached to the root network device, to said any constrained child network device without removal of the corresponding certificate.

12. The apparatus of claim 7, wherein the processor circuit is configured for removing, from any second authentication message generated by the authenticator device and destined for any constrained network device via any constrained child network device attached to the root network device, the corresponding certificate prior to forwarding of a corresponding modified second authentication message, without the corresponding certificate, via the corresponding constrained child network device.

13. One or more non-transitory tangible media encoded with logic for execution by a machine and when executed by the machine operable for:

forwarding, by the machine implemented as a root network device in a low power and lossy network, an authentication message to a constrained child network device having attached to the root network device within the low power and lossy network, the authentication message having been generated by an authenticator device and specifying a certificate associated with the authenticator device;

receiving, by the root network device, a second authentication message generated by the authenticator device and destined for a second constrained network device via the constrained child network device, the second authentication message comprising the certificate;

generating a modified second authentication message that does not include the certificate based on the root network device removing, from the second authentication message, the certificate; and outputting, by the root network device, the modified second authentication message toward the second constrained network device via the constrained child network device, the modified second authentication message causing the constrained child network device to restore the second authentication message for delivery to the second constrained network device, based on insertion of the certificate back into the modified second authentication message.

14. The one or more non-transitory tangible media of claim 13, wherein the forwarding includes causing the constrained child network device to cache the certificate in the authentication message.

15. The one or more non-transitory tangible media of claim 13, wherein the forwarding includes:
receiving the authentication message from the authenticator device via a wired data link; and
outputting the authentication message to the constrained child network device via a wireless data link.

16. The one or more non-transitory tangible media of claim 13, wherein the authentication message is an Extensible Authentication Protocol Transport Layer Security (EAP-TLS) server hello message and the certificate is a Remote Authentication Dial-In User Service (RADIUS) server certificate.

17. The one or more non-transitory tangible media of claim 13, wherein the forwarding includes forwarding any authentication message, received from the authenticator device and destined for any constrained child network device attached to the root network device, to said any constrained child network device without removal of the corresponding certificate.

18. The one or more non-transitory tangible media of claim 13, wherein the generating includes removing, from any second authentication message generated by the authenticator device and destined for any constrained network device via any constrained child network device attached to the root network device, the corresponding certificate prior to forwarding of a corresponding modified second authentication message, without the corresponding certificate, via the corresponding constrained child network device.

19. A method comprising:
receiving from a root network device, by a constrained child network device in a low power and lossy network, an authentication message having been generated by an authenticator device and specifying a certificate associated with the authenticator device;

joining, by the constrained child network device, the low power and lossy network based on the authentication message, including caching the certificate;

receiving, by the constrained child network device from the root network device, a modified second authentication message modified by the root network device and destined for a second constrained network device attached to the constrained child network device, the modified second authentication message having been modified based on the root network device having removed the corresponding certificate from a corresponding second authentication message generated by the authenticator device;

inserting the certificate into the modified second authentication message for generation of a restored second authentication message; and sending the restored second authentication message to the second constrained network device.

20. One or more non-transitory tangible media encoded with logic for execution by a machine and when executed by the machine operable for:
receiving from a root network device, by the machine implemented as a constrained child network device in a low power and lossy network, an authentication message having been generated by an authenticator device and specifying a certificate associated with the authenticator device;

joining, by the constrained child network device, the low power and lossy network based on the authentication message, including caching the certificate;

receiving, by the constrained child network device from the root network device, a modified second authentication message modified by the root network device and destined for a second constrained network device attached to the constrained child network device, the modified second authentication message having been modified based on the root network device having removed the corresponding certificate from a corresponding second authentication message generated by the authenticator device;

inserting the certificate into the modified second authentication message for generation of a restored second authentication message; and sending the restored second authentication message to the second constrained network device.

* * * * *